(12) United States Patent
Bryll

(10) Patent No.: US 7,636,478 B2
(45) Date of Patent: Dec. 22, 2009

(54) FAST MULTIPLE TEMPLATE MATCHING USING A SHARED CORRELATION MAP

(75) Inventor: Robert Kamil Bryll, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 609 days.

(21) Appl. No.: 11/461,418

(22) Filed: Jul. 31, 2006

(65) Prior Publication Data

US 2008/0025616 A1   Jan. 31, 2008

(51) Int. Cl.
  G06K 9/62   (2006.01)
(52) U.S. Cl. .................. 382/209; 382/217; 382/218; 382/219; 382/221
(58) Field of Classification Search .......... 382/209, 382/217, 218, 219, 221
  See application file for complete search history.

(56) References Cited

U.S. PATENT DOCUMENTS

| | | | |
|---|---|---|---|
| 4,589,140 A | 5/1986 | Bishop et al. | |
| 5,495,537 A | 2/1996 | Bedrosian et al. | |
| 6,249,603 B1 | 6/2001 | Rucklidge | |
| 6,928,116 B2 | 8/2005 | Weon | |
| 2003/0198295 A1 | 10/2003 | Chen et al. | |
| 2005/0025377 A1 | 2/2005 | Avinash et al. | |
| 2005/0058322 A1* | 3/2005 | Farmer et al. ............... | 382/103 |
| 2005/0271254 A1* | 12/2005 | Hougen ....................... | 382/104 |
| 2006/0093205 A1 | 5/2006 | Bryll et al. | |

OTHER PUBLICATIONS

Bei, C.D., and R.M. Gray, "An Improvement of the Minimum Distortion Encoding Algorithm for Vector Quantization," *IEEE Transactions of Communications* 33(10):1132-1133, Oct. 1985.

Di Stefano, L., and S. Mattoccia, "Fast Template Matching Using Bounded Partial Correlation," *Machine Vision and Applications* 13(4):213-221, Feb. 2003.

Di Stefano, L., et al., "An Efficient Algorithm for Exhaustive Template Matching Based on Normalized Cross Correlation," *Proceedings of the 12th International Conference on Image Analysis and Processing*, Bologna, Italy, 2003.

Gavrila, D.M., "Multi-Feature Hierarchical Template Matching Using Distance Transforms," *Proceedings of the 14th International Conference on Pattern Recognition*, vol. 1, 1998, pp. 439-444.

(Continued)

*Primary Examiner*—Matthew C Bella
*Assistant Examiner*—Mike Rahmjoo
(74) *Attorney, Agent, or Firm*—Christensen O'Connor Johnson Kindness PLLC

(57) ABSTRACT

A method is provided that increases throughput and decreases the memory requirements for matching multiple templates in image. The method includes determining a set of inter-template early elimination values that characterize the degree of matching between various templates and the image, at various locations in the image. A later-analyzed template may be rejected as a potential match at a location in the image based on comparing a value characterizing its degree of match at that location to an inter-template early elimination value corresponding to the degree of match of an earlier-analyzed template at that location. The compared values may be determined by different sets of operations, and may be normalized such that they are properly comparable. The inter-template early elimination conditions may be stored in a shared correlation map. The shared correlation map may be analyzed to determine the matching locations for multiple templates in the image.

16 Claims, 10 Drawing Sheets

OTHER PUBLICATIONS

Gavrila, D.M., and V. Philomin, "Real-Time Object Detection for 'Smart' Vehicles," *Proceedings From IEEE International Conference on Computer Vision*, vol. 1, Kerkyra, Greece, 1999, pp. 87-93.

Li, W., and E. Salari, "Successive Elimination Algorithm for Motion Estimation," *IEEE Transactions on Image Processing* 4(1):105-107, Jan. 1995.

*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7.0, 1st ed., Manual No. 99MCB225A1, Series No. 359, Mitutoyo Corporation & Micro Encoder Inc., Kanagawa, Japan, Jan. 2003.

\* cited by examiner

FAST MULTIPLE TEMPLATE MATCHING USING A SHARED CORRELATION MAP

FIELD OF THE INVENTION

The invention relates generally to methods for operating a machine vision inspection system, and more particularly to methods for matching multiple templates or patterns within an image.

BACKGROUND OF THE INVENTION

Precision machine vision inspection systems (or "vision systems" in short) can be utilized to obtain precise dimensional measurements of inspected objects. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are described in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, uses a microscope-type optical system to provide images of a workpiece at various magnifications, and moves the stage to traverse the workpiece surface beyond the limits of any single video image.

High throughput operation is generally desired in such systems. Also, increasingly, it is expected that "intelligent" programs, operations, and/or video tools, will operate to inspect a wider range of workpieces with less customized programming. Also, increasingly, "100%" inspection is required. The present invention is directed to systems and methods for enhancing these capabilities for general-purpose precision machine vision inspection systems.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A novel method that increases the throughput for matching multiple templates in image, and reduces the memory requirements that may otherwise be associated with matching multiple templates in an image, is provided. The method may be used to further enhance the throughput that may be achieved with previously-known methods that speed up the matching of single templates in an image.

It should be appreciated that although increased template matching speed may contribute simultaneously to all of the desired improvements outlined above (e.g., higher throughput, less need for program or video tool customization, a greater capability to inspect 100% of the various features in an image, etc.), the problem of high-speed template matching is already well-studied and is, in general, a relatively mature field. Therefore, even small additional improvements in template matching throughput may be highly valued.

The novel multiple template matching method presented here may increase the template matching throughput, and reduce the template matching memory use, of a general-purpose precision machine vision inspection system, by several percent or more, in various applications—depending on the number, type, and spatial distribution of features to be inspected in an image. Generally, as the number of different templates to be matched in an image increases, and as the number of features to be matched in an image increases, the benefits of the methods disclosed herein will also increase.

In accordance with one aspect of the invention, the method may comprise determining at least one early elimination condition, the at least one early elimination condition comprising an inter-template early elimination condition, wherein the inter-template early elimination condition is based at least partially on an inter-template early elimination value that characterizes the degree of matching between one of the plurality of templates and the image, at a location in the image. In accordance with a further aspect of the invention, a first inter-template early elimination value may be determined for at least a first location an the image, the first inter-template early elimination value characterizing the degree of matching between a first template of the plurality of templates and the image at the first location; and at least a second template of the plurality of templates may be rejected as a potential match at the first location based on comparing the first inter-template early elimination value to a second value characterizing the degree of matching between the second template of the plurality of templates and the image at the first location.

In accordance with another aspect of the invention, the first inter-template early elimination value may be determined according to a first set of operations, and the second value may be determined according to a second set of operations that is different than the first set of operations. In accordance with a further aspect of the invention, the first inter-template early elimination value may consist of a correlation function value determined based on a complete set of correlation function value determining operations comprising pixel-by-pixel comparison operations between the first template and the image, at a first level of resolution; and the second value may consist of an incomplete correlation function value determined based on an incomplete set of correlation function value determining operations comprising pixel-by-pixel comparison operations between the second template and the image at the first level of resolution. In accordance with a further aspect of the invention, the incomplete set of correlation function value determining operations may be ended when an incomplete correlation function value corresponding to the second template at the first position indicates a worse template match than the first inter-template early elimination value.

In accordance with another aspect of the invention, each respective inter-template early elimination value may be normalized such that each of their values reflect the degree to which their respective templates match the image at their respective locations in the image, relative to the other respective inter-template early elimination values.

In accordance with another aspect of the invention, a shared correlation map may be determined, the shared correlation map comprising at least one respective inter-template early elimination value stored in a manner such that it is associated with its corresponding respective location in the image, and for each respective inter-template early elimination value of the shared correlation map, an indication of its corresponding respective template may be stored. In accordance with a another aspect of the invention, each respective inter-template early elimination value of the shared correlation map may be a normalized correlation function value determined based on a complete set of correlation function value determining operations comprising pixel-by-pixel comparison operations at a first level of resolution between its corresponding respective template and the image at the corresponding respective location. In accordance with a further aspect of the invention, determining the shared correlation map may comprise replacing a respective normalized inter-template early elimination value of the shared correlation map and its corresponding respective template that are associated with a particular location in the image when a subsequent normalized correlation function value determined based on the complete set of correlation function value determining operations comprising pixel-by-pixel comparison operations between a different respective template and the image at a first level of resolution, at the particular location, indicates that the different respective template provides a better match to the image at that particular location.

In accordance with another aspect of the invention, the method may comprise determining a set of respective template matching positions and their corresponding respective matching templates, based on analyzing the shared correlation map. In accordance with a further aspect of the invention, analyzing the shared correlation map may comprise treating the shared correlation map as a pseudo-image, determining at least a first template matching region in the pseudo-image, and determining a first respective template matching position for a first respective matching template within the first template matching region. In accordance with a further aspect of the invention, each respective inter-template early elimination value of the shared correlation map may be a correlation function value determined based on a complete set of correlation function value determining operations comprising pixel-by-pixel comparison operations at a first level of resolution between its corresponding respective template and the image at the corresponding respective location, the first respective template matching position may be a preliminary template matching position; and the method may further comprise estimating a refined matching position for the first respective matching template, based on a fine resolution correlation map, wherein the fine resolution correlation map may be determined based on correlating the first respective matching template to the image at a higher level of resolution than the first level of resolution, in a local area including the preliminary first respective template matching position.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
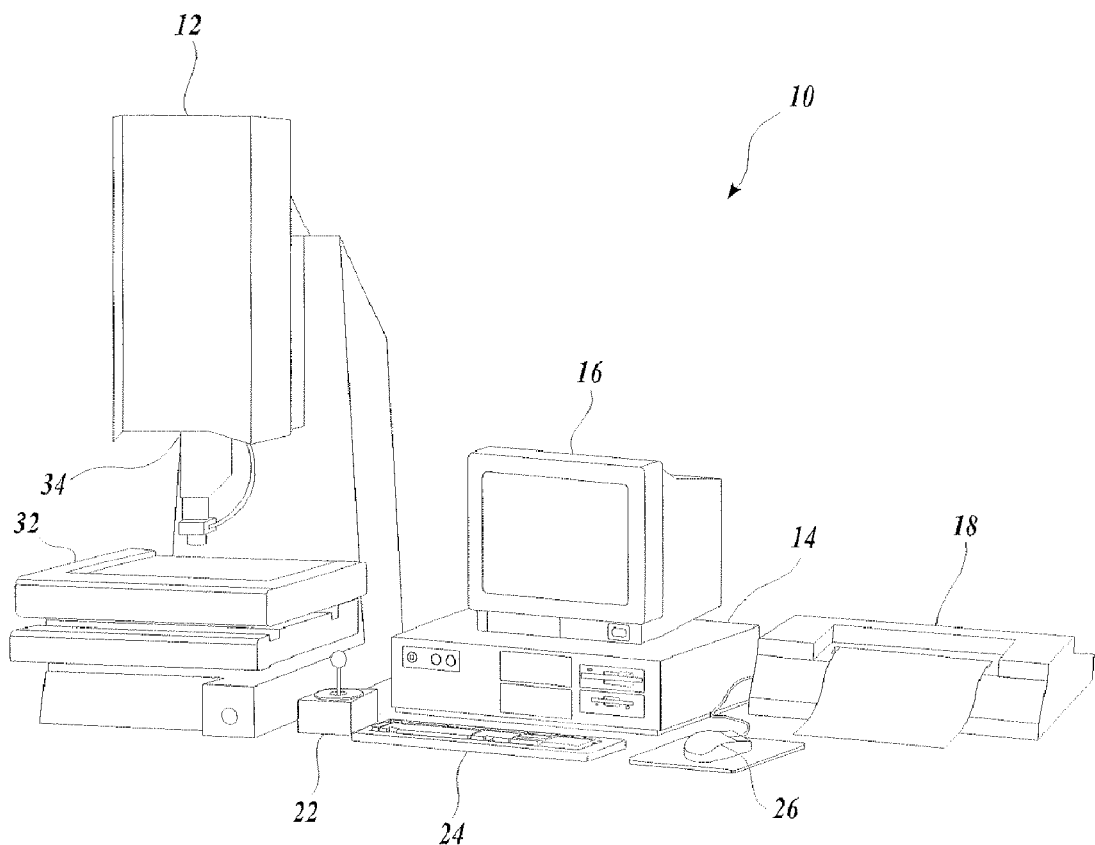
FIG. 1 is a diagram showing various typical components of a general-purpose machine vision inspection system.

FIG. 1 is a diagram of one exemplary machine vision inspection system 10 usable in accordance with the present invention. The machine vision inspection system 10 includes a vision measuring machine 12 that is connected to exchange data and control signals with a controlling computer system 14. The controlling computer system 14 is further connected to exchange data and control signals with a monitor 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses to provide various magnifications. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in U.S. patent application Ser. No. 10/978,227, which is incorporated herein by reference.

Figure 2:
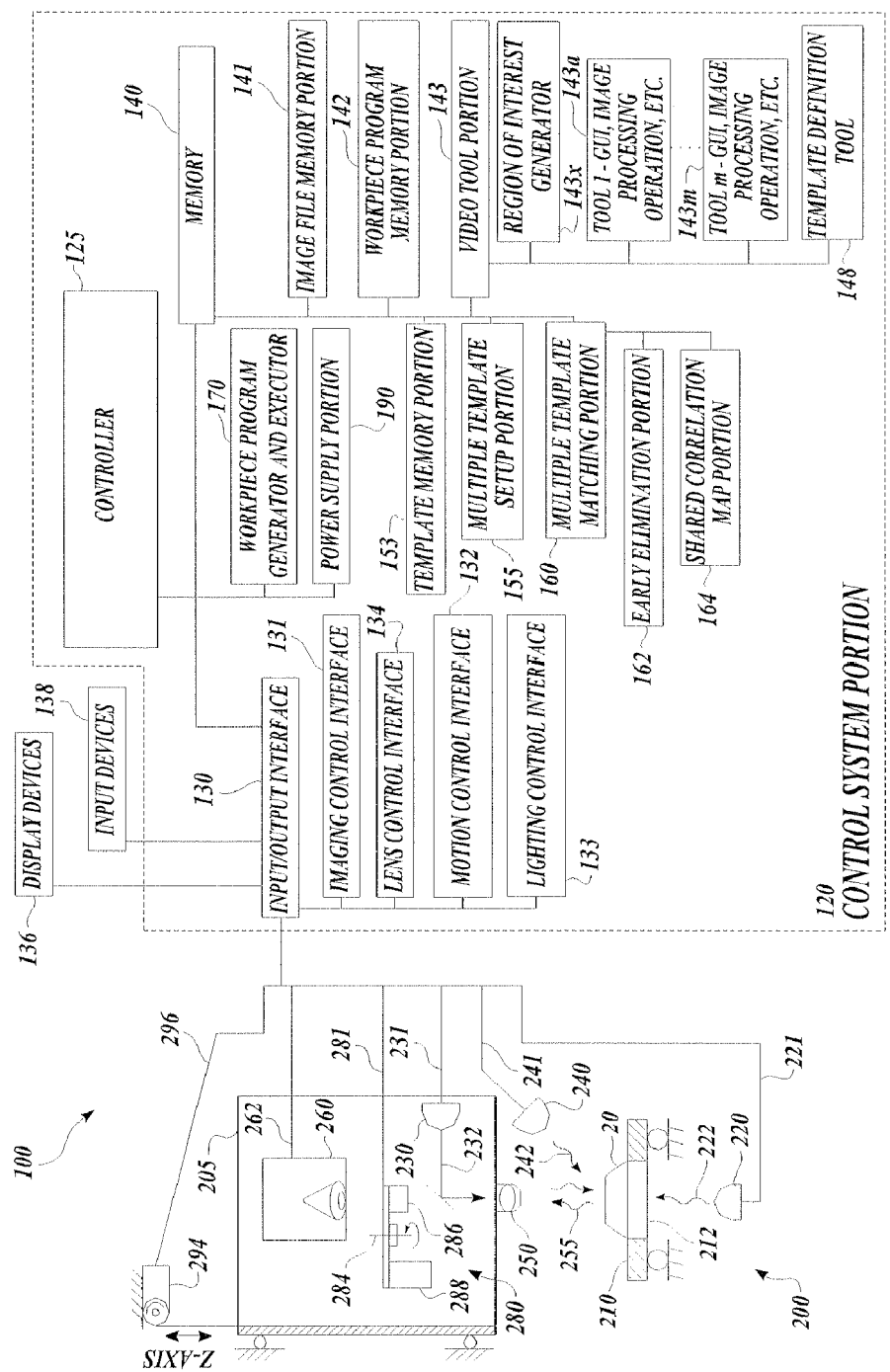
FIG. 2 is a diagram of a control system portion and a vision components portion of a machine vision inspection system.

FIG. 2 is a diagram of a control system portion 120 and a vision component portion 200 of a machine vision inspection system 100 usable in accordance with this invention. The control system portion 120 is utilized to control the vision component portion 200. The vision component portion 200 includes an optical assembly portion 205, light sources such as a stage light source 220, a coaxial light source 230 and a surface light source 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294.

A workpiece 20 that is to be imaged is placed on the workpiece stage 210. One or more of the light sources 220, 230, and 240 emits source light 222, 232, or 242, respectively, to illuminate the workpiece 20. The source light is reflected or transmitted by the workpiece as workpiece light 255, which passes through the objective lens 250 and the turret lens assembly 280 to the camera system 260. The image of the workpiece 20, captured by the camera system 260, is output on a signal line 262 to the control system portion 120.

The light sources 220, 230, and 240 are all connected to the control system portion 120 through signal lines or busses 221, 231, and 241, respectively. In various embodiments, the optical assembly portion 205 may include additional or different lenses, and other optical elements such as apertures, beam-splitters and the like, such as may be needed for providing coaxial illumination, or other desirable machine vision inspection system features. When it is included in the machine vision inspection system 100, the turret lens assembly 280 may include at least a first turret lens position and lens 286 and a second turret lens position and lens 288. The control system portion 120 controls rotation of the turret lens assembly 280 about axis 284, between at least the first and second turret lens positions, through a signal line or bus 281.

The distance between the workpiece stage 210 and the optical assembly portion 205 can be adjusted to change the focus of the image of the workpiece 20. In various embodiments, the optical assembly portion 205 is movable in the vertical Z axis direction relative to the workpiece stage 210 using a controllable motor 294 that drives an actuator, a connecting cable, or the like. The term Z axis, as used herein, refers to the axis that is intended to be used for focusing the image. The controllable motor 294, when used, is connected to the input/output interface 130 via a signal line 296.

As shown in FIG. 2, in various embodiments, the control system portion 120 includes a controller 125, an input/output interface 130, a memory 140, a workpiece program generator and executor 170, and a power supply portion 190. The input/output interface 130 may include an imaging control interface 131, a motion control interface 132, a lighting control interface 133, and a lens control interface 134. Each of these components, as well as the additional components described below, may be interconnected by one or more data/control buses and/or application programming interfaces, or by direct connections between the various elements.

The memory 140 includes an image file memory portion 141, a workpiece program memory portion 142 that may include one or more part programs, or the like, and a video tool portion 143. The video tool portion 143 may include tool portions 143a-143m, for example, which determine the GUI, image processing operations, etc., for each of the corresponding video tools. The video tool portion 143 may include a region of interest generator 143x that supports automatic, semi-automatic and/or manual operations that define various regions of interest that are operable in various video tools included in the video tool portion 143. In various embodiments of the present invention, the video tool portion 143 also includes a template definition tool 148, which determines the GUI, image processing operations, etc., for defining a template and/or parameters that may be included in multiple template matching operations, to be used during learn mode operations of a machine vision inspection system.

The memory 140 also includes a template memory portion 153, a multiple template setup portion 155, and a multiple template matching portion 160 that may include an early elimination portion 162 and a shared correlation map portion 164. The template memory portion 153 may store the various templates and corresponding parameters that are defined using the template definition tool 148, as described in greater detail below. The various templates may be stored as one or more general template libraries, or in one or more workpiece-specific sets, or application-specific sets, or the like. The template memory portion 153 may also store any other useful template matching parameters, including parameters that may be specific to certain multiple template matching operations, or that may be specific to using a particular template (e.g., image and template pre-filtering parameters), or set of templates, to inspect a particular workpiece during run mode operations (and also during learn mode operations in a "test" run). It may also include routines for modifying template parameters based current image parameters (e.g., brightness, contrast, magnification, etc.) or based on accumulated matching data, or the like. The multiple template setup portion 155 may include routines for defining a multiple template set for a specific type of image or application, for automatically determining a set of rotated and/or scaled versions of a template, or the like. It may also include a routine for determining and/or storing a preferred "matching sequence" for multiple templates. For example, if a previously determined template parameter, or operator knowledge, indicates that several matches may be expected for a template in a workpiece image to be inspected, then (other factors being equal) it may be advantageous to search a workpiece image using that template before searching the image using a template where only one match is expected. The reason is that when using an inter-template early elimination criteria according to this invention, if multiple matches for a template are found in an image, an inter-template early elimination criteria (e.g., the correlation value for that template at the match location) will be established at each of the match locations. Subsequent template searches may then be preempted or terminated at any of the multiple locations, as soon as it is apparent that the correlation value for the second template cannot be better than the previously determined inter-template early elimination criteria. Thus, the later search may potentially be accelerated at multiple locations.

The multiple template matching portion 160 may include an early elimination portion 162 and a shared correlation map portion 164. In one embodiment, routines and or operations included in the early elimination portion 162 may include known types of successive elimination algorithm (SEA) operations. Briefly, SEA operations efficiently compute certain values that "bound" possible correlation value outcomes. The bounding computations may depend on both the current template to be matched, as well as image data corresponding to the various locations to be searched in the image. Prior to determining full correlation results, for example, by a "sum of absolute differences" (SAD) correlation method, at each location in the shared correlation map, the appropriate bounding value may be compared to any previously established required matching threshold, or the like. Alternatives to a SAD correlation may include a sum of squared differences (SSD) method, or a normalized cross correlation (NCC) image-template similarity measures, or the like. If the bounding value fails to satisfy the required matching threshold at that location (which may be the best previous correlation value determined by previous template matching operations at that location, as described further below), it is certain that the full correlation result for the current template at that location will also fail. Therefore, that location may be eliminated as a potential match location for the current template without the full computation of the correlation at that location. The shared correlation map portion 164 may include routines and/or operations that perform correlation operations (e.g., by a "sum of absolute differences" correlation method, or the like), compare the resulting correlation values to previously established limits and/or correlation values, and store the best correlation value for a location in a shared correlation map, for example, as described in greater detail below with reference to FIGS. 4-6. It should be appreciated that in various embodiments, the portions 162 and 164 may be merged and/or indistinguishable.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130.

The signal lines or busses 221, 231, and 241 of the light 220, 230, and 240, are all connected to the input/output interface 130. The signal lines 262, and 296, from the camera system 260 and the controllable motor 294, respectively, are connected to the input/output interface 130. In addition to carrying image data, the signal line 262 may carry a signal from the controller 125 that initiates image acquisition. One or more display devices 136 and input devices 138 can also be connected to the input/output interface 130, in order to view, create and/or modify part programs (workpiece programs), to view the images captured by the camera system 260, and/or to provide a user interface that allows direct control of the vision system components portion 200.

In various exemplary embodiments, a user may use the machine vision inspection system 100 to create workpiece image acquisition instructions for the workpiece 20, by explicitly coding the instructions using a workpiece programming language (e.g., a machine vision inspection system scripting language), and/or by generating the instructions by moving the machine vision inspection system 100 through an image acquisition training sequence such that the workpiece program instructions capture the training sequence. Once a set of workpiece image acquisition instructions are defined, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136. The control system portion 120 is further usable to recall stored workpiece inspection images, to inspect and analyze workpiece features in such workpiece inspection images, and to store and/or output the inspection results. Some or all of these methods may be embodied in various video tools included in the video tool portion 143 of the memory 140, such as an autofocus tool, edge/boundary detection tools, dimension measuring tools, template matching tools, and the like. Some of these tools are routinely used in a variety of commercially available machine vision inspection systems, such as the QUICK VISION® series of vision systems and the associated QVPAK® software. After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140. The procedures outlined above may be used to create a program or routine that implements a multiple template matching method according to this invention, and/or to automatically run that program or routine to inspect an image, if desired.

Figure 3:
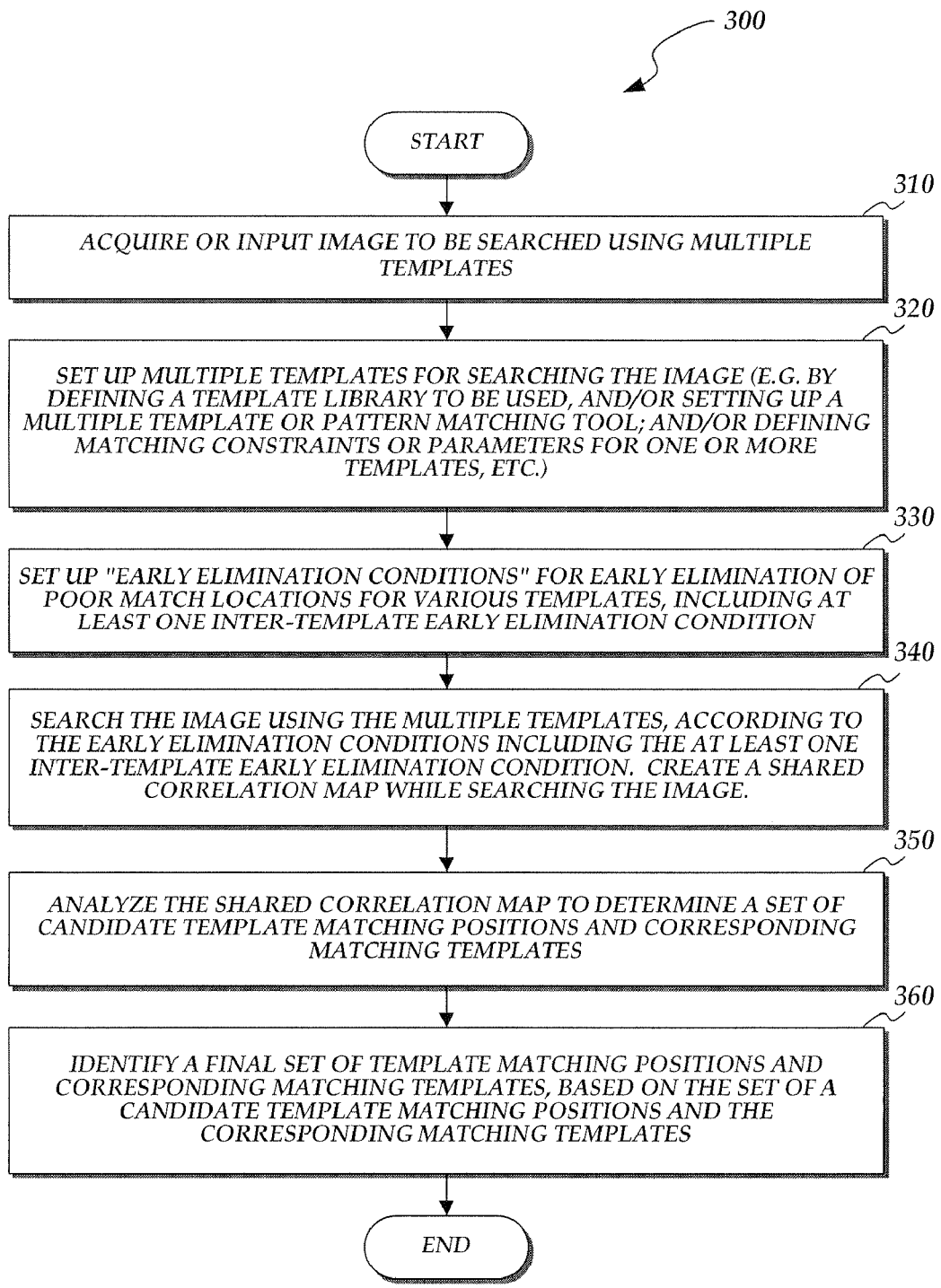
FIG. 3 is a flow diagram illustrating one exemplary embodiment of a multiple template matching method according to the invention.

FIG. 3 is a flow diagram illustrating one exemplary embodiment of a multiple template matching method 300 in accordance with this invention. The method starts, and at a block of 310 an image is acquired or recalled, and input to be searched using multiple templates. At a block 320, the multiple templates that are to be used for searching the image are set up (e.g., by defining a template set or library to be used, and/or setting up a multiple template matching tool or routine, and/or defining various matching constraints or parameters to be used, etc.). In various embodiments or applications, the multiple template set up performed in block 320 may comprise initiation of a predetermined, and/or automatic, multiple template default set up. At a block 330, "early elimination conditions" are set up or selected, including at least one inter-template early elimination condition in accordance with this invention. Various early elimination conditions usable according to this invention are described in greater detail below.

In general, an inter-template early elimination condition comprises determining or identifying a correlation value, or other template matching parameter or result, that is associated with a first template, and then applying that correlation value or other parameter to expedite template matching operations for a one or more additional templates. Briefly, one exemplary inter-template early elimination condition that may be applied in various embodiments comprises using a first correlation value determined for a first template at a particular template matching location in an image, as a matching threshold which must be bettered by a second correlation value determined for a second template at that location, in order for the second template to be considered a match at that location. For such a condition, matching operations for a second template at that location may be preempted, or terminated, as soon as it is apparent that the correlation value for the second template cannot be better than the first correlation value. Thus, evaluation of subsequent potential template matches at that location may be expedited in accordance with one aspect of this invention.

At a block 340, a shared correlation map may be created while searching the image using the multiple templates. The image is searched according to the early elimination conditions, including the at least one inter-template early elimination condition. Briefly, a shared correlation map may be a map or pseudo-image that mirrors the potential matching locations (pixels) in the image to be searched. In various embodiments, correlation values corresponding to potential matches are recorded at the potential matching location in the shared correlation map during each of the multiple template searches. The shared correlation map may both facilitate a multiple template matching process according to this invention, as well as record its progress and outcome. Various other aspects of the creation and use of a shared correlation map are described further below.

At a block 350, the shared correlation map may be analyzed to determine a set of candidate template matching positions and the corresponding matching templates. Finally, at a block 360, a final set of template matching positions and corresponding matching templates may be identified, based on the set of candidate template matching positions and the corresponding matching templates determined at block 350, and the method ends.

Figure 4A:
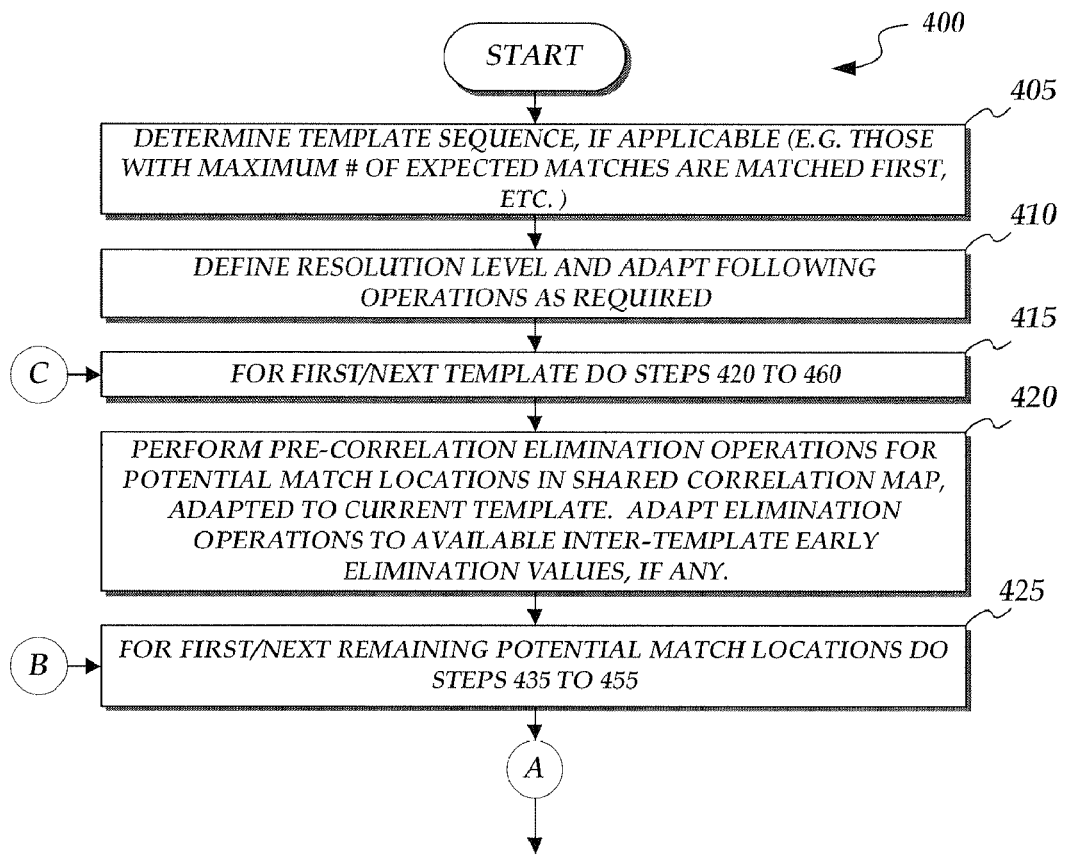
FIGS. 4A and 4B show a flow diagram illustrating one exemplary method for providing a shared correlation map according to one aspect of the invention.
Figure 4B:
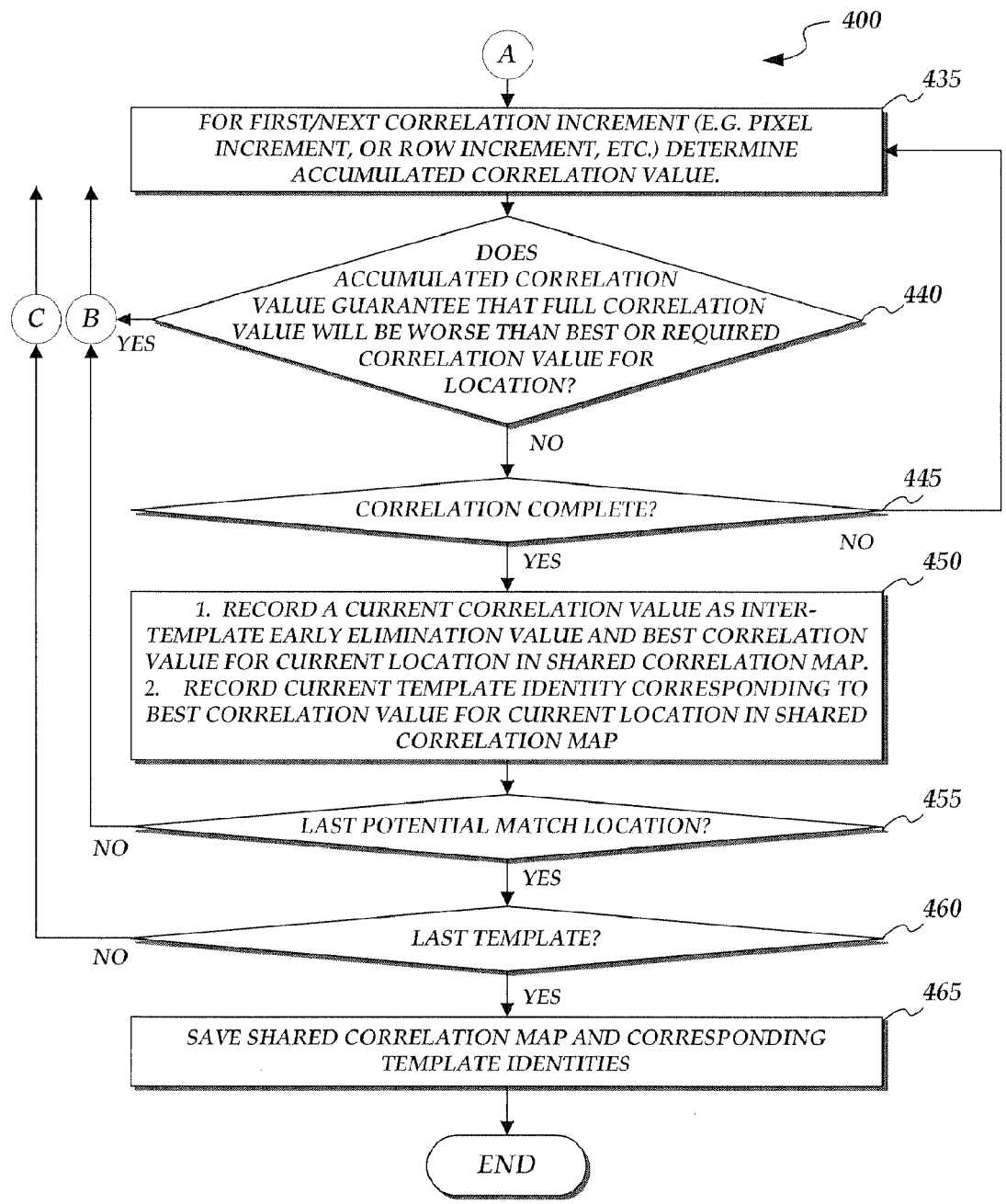

FIGS. 4A and 4B show a flow diagram illustrating one exemplary method for providing a shared correlation map based on multiple template matching operations according to this invention. The method begins, and at a block 405 a template sequence may be determined for a previously determined set of multiple templates. As one example, if a previously determined template parameter, or operator knowledge, indicates that several matches may be expected for a template in a workpiece image to be inspected, then (other factors being equal) it may be advantageous to search a workpiece image using that template before searching the image using a template where only one match is expected. The reason is that when using an inter-template early elimination criteria according to this invention, if multiple matches for a template are found in an image, an inter-template early elimination criteria (e.g., the correlation value for that template at the match location) will be established at each of the match locations. Subsequent template searches may then be preempted or terminated at any of the multiple locations, as soon as it is apparent that the correlation value for the second template cannot be better than the previously determined inter-template early elimination criteria. Thus, the later search may potentially be accelerated at multiple locations.

At, a block 410, a resolution level other than a full resolution level may be determined for following multiple template search operations. For example, the teachings of U.S. Pat. No. 6,928,116 and/or U.S. Patent Application Publication No. 2003/0198295 United States, each of which is incorporated herein by reference in its entirety, may be applied to prepare lower resolution versions of the templates to be matched and to prepare the image data in a corresponding manner. The advantage of lower resolution template matching is that in various embodiments according to this invention, a multi-level matching process similar to that described in the previously incorporated '116 and '295 references may be used. (In this example, a two-level process is described.) In such a case, lower resolution preliminary matching operations are greatly accelerated in comparison to full resolution matching operations. In various embodiments, a similarly sub-sampled version of each of the multiple templates may be prepared according to known techniques, and the image may be similarly sub-sampled. In one embodiment, a maximum size limit, or limiting number of pixel operations during image-template matching, may be imposed on the sub-sampled versions, if desired. Larger templates may be sub-sampled at a coarser level than smaller templates, in order to comply with a maximum size limit or a "maximum number of operations" limit. In one embodiment, a nominal initial resolution level may be two times coarser than the full resolution level (that is, pixels in alternate rows and columns may be skipped, reducing the number of pixel processed by a factor of four).

At a block 415, a first or next template is selected as the current template to be used for the operations of blocks 420 through 460. At the block 420, pre-correlation elimination operations are performed for potential match locations in the shared correlation map. The pre-correlation elimination operations may be adapted for each new current template that is selected at block 415. In general, for the current template, the operations of block 420 may eliminate some of the potential match locations in the image to be searched. The shared correlation map may be used to implement the pre-correlation elimination operations. In general, as previously mentioned, the shared correlation map mirrors the potential matching locations (pixels) in the image to be searched. As a current template is used to search the image, correlation values corresponding to potential matches are recorded at the potential matching locations in the shared correlation map, and used as thresholds that may preempt, or terminate, matching operations for subsequent templates at those locations. However, locations in the shared correlation map may also simply be filled or initialized with default values or the like, that may also be used as thresholds in the manner just described. Filling or initializing the shared correlation map is one of the operations that may be performed at block 420. In one embodiment, if the shared correlation map has not previously been initialized, and does not yet include correlation values determined by previous template matching operations, then the entire shared correlation map is initialized with a default noise threshold value that is certain not to eliminate correlation values corresponding to potential matches. Ideally, the default threshold value may also potentially eliminate at least some correlation values that are certainly too weak to correspond to potential matches. If a template-specific matching threshold value is available for the current template (e.g., as one of the template parameters defined for the current template), and if it increases the range of correlation values that are certainly too weak to correspond to potential matches without the possibility of rejecting true matches by other types of templates, then that template-specific matching threshold value may replace the default threshold value in the shared correlation map.

In one embodiment, once the shared correlation map is filled as outlined above, operations continue at block 425. However, in other embodiments, additional pre-correlation elimination operations are performed at block 420. In one embodiment, known types of successive elimination algorithm (SEA) operations may be performed at block 420. As previously indicated, SEA operations may efficiently compute certain values that "bound" possible correlation value outcomes. The bounding computations may depend on both the current template to be matched, as well as image data corresponding to the various locations to be searched in the image. Prior to determining full correlation results (e.g., by a "sum of absolute differences" correlation method), at each location in the shared correlation map, the appropriate bounding value may be compared to any previously established required matching threshold, or the like. If the bounding value fails to satisfy the required matching threshold at that location, which may be the best previous correlation value determined by previous template matching operations at that location, it is certain that the full correlation result for the current template at that location will also fail. Therefore, that location may be eliminated as a potential match location for the current template without the full computation of the correlation at that location.

At a block 425 a first or next remaining potential match location is selected as the current location for the operations of blocks 435 through 455. At block 435, correlation value determination operations start or continue for the current potential match location by traversing the template according to the current sampling level (e.g., pixel by pixel) and determining a first or next increment of an accumulated correlation value, according to known methods (e.g., by an SAD correlation method, or the like). It should be appreciated that in various embodiments, the correlation values may be normalized by dividing them by the image-template overlap size for the given current potential match location to obtain per-pixel correlation averages. All termination thresholds stored in the shared correlation map may also be expressed as per-pixel correlation averages. In this manner, a correlation value (a "match value") that is independent from the image-template overlap size and/or number of "active" pixels in the template can be achieved. (That is, the correlation values for templates of different sizes may be legitimately compared to determine the best match at a location.) In general, it is anticipated that templates of various sizes will be matched to an image. Therefore, in a majority of embodiments and applications, it may be assumed that the various correlation values described herein are normalized correlation values.

Next, at a decision block 440, if the accumulated correlation value determined at block 435 guarantees that a complete correlation value (e.g., a complete normalized correlation value) will be worse than the matching threshold in the shared correlation map for the current location, then operation returns to block 425 where a new potential match location is selected for subsequent operations. Otherwise, operation continues at the decision block 445.

When operation continues at the decision block 445, if the entire correlation value calculation has not been completed for the current location, then operation returns to block 435 where the correlation value calculation is continued. Otherwise, operation continues at block 450, where the previous operations have insured that the current complete correlation value (e.g., a complete normalized correlation value) is the best correlation value so far determined for the current location. Therefore, the current correlation value is entered into the shared correlation map at the current location where it functions as an inter-template early elimination value and provides a new matching threshold for subsequent template matching operations at that location. In addition, since it provides the best correlation value so far determined at that location, the current template is recorded or stored in manner that indicates it to be the tentative best matching template at the current location. Operation then continues at a decision block 455, where it is determined whether the current match location is the last potential match location. If there are additional potential match locations to be evaluated, then operation returns to block 425. Otherwise operation continues to decision block 460 where it is determined whether matching operations have been completed for the entire set of multiple templates. If there are more templates to be for matching in the current image, then operation returns to block 415. Otherwise, operation continues to block 465 where the ending shared correlation map is saved, along with the ending set of template identities and corresponding locations, as determined according to the previous operations of block 450, and the method ends.

Figure 5:
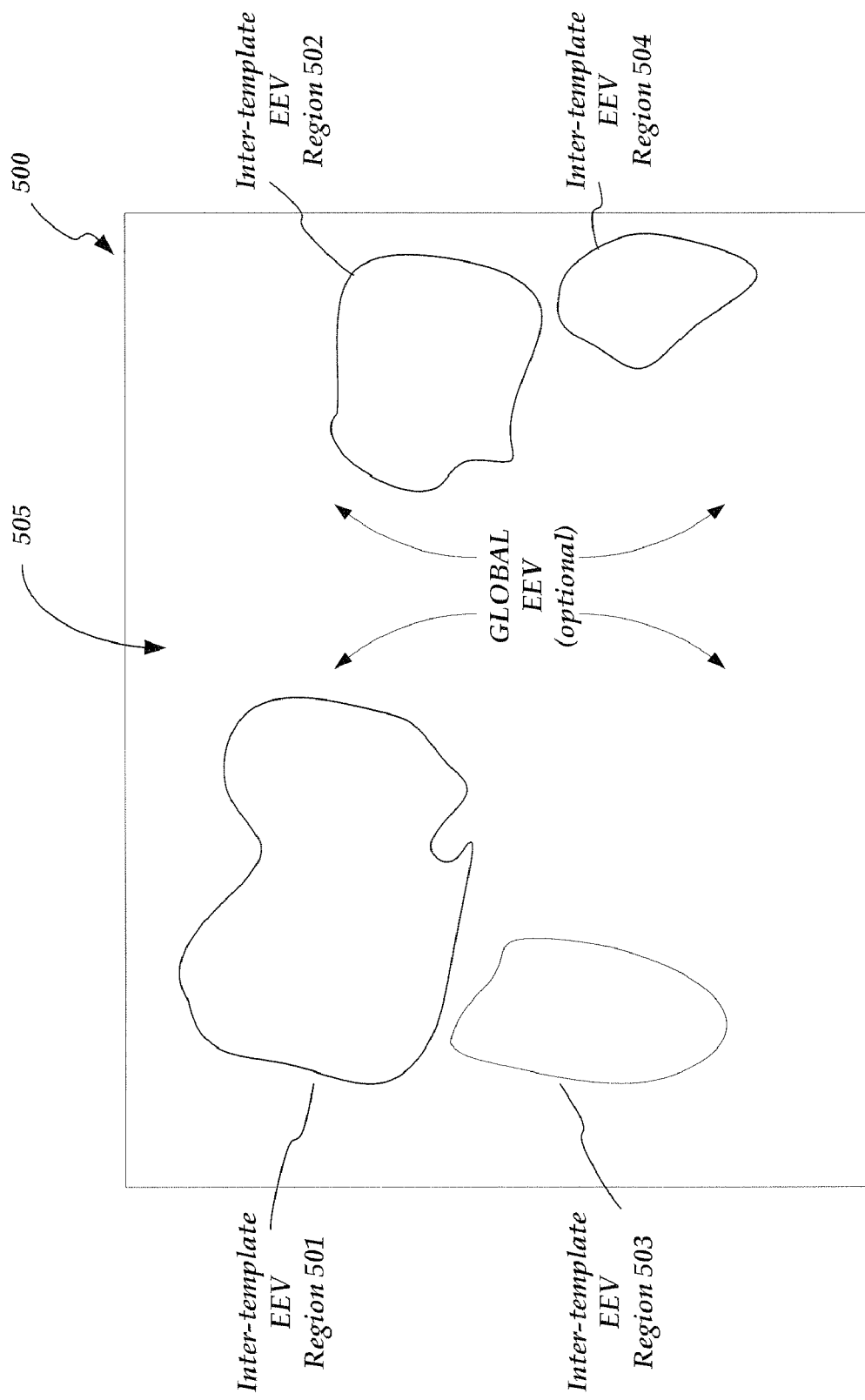
FIG. 5 is a diagram schematically illustrating various aspects of a shared correlation map.

FIG. 5 is a diagram schematically illustrating various aspects of a shared correlation map 500. It will be appreciated that the shared correlation map 500 may be a type of pseudo-image that may include "pixels" having values corresponding to template-matching correlation values and/or other assigned values, or the like. Thus, various known image processing techniques may be conveniently applied to analyze the shared correlation map (or pseudo-image) 500 for probable template matches. In particular, the shared correlation map 500 may include inter-template early elimination values (EEV) (e.g., best correlation values), that are determined according to a process such as that described above with respect to FIGS. 4A and 4B. The shared correlation map 500 may also include a background or default "global EEV" portion 505 that comprises pixels having default or threshold values. As previously outlined, in one embodiment, the entire shared correlation map may be initialized with a default noise threshold value that is certain not to eliminate template correlation values corresponding to potential matches. Ideally, the default threshold value may also potentially eliminate at least some correlation values that are certainly too weak to correspond to potential matches. As will be described in more detail below with respect to FIGS. 6A and 6B, the shared correlation map 500 may be analyzed to identify various template matching positions for a plurality of matched templates.

It will be appreciated that a pixel corresponding to an inter-template EEV (e.g., a best correlation value for a pixel location) will generally correspond to a "significant" template correlation value that is better than the global EEV, or a default threshold value. In various embodiments, this may be a value determined in the correlation map according to operations of block 450 of FIG. 4B, for example. As shown in FIG. 5, in the vicinity of a matching location, at least some of the inter-template EEVs may generally form inter-template EEV regions, such as the regions 501, 502, 503, and 504. Depending on the global EEV, or default threshold value, and/or preliminary thresholding operations that may be performed, an inter-template EEV region may be significantly smaller than the illustrated relative sizes of the regions 501-504, which are illustrative only and not limiting. In general, for pixel locations in the shared correlation map 500 that include a significant correlation value, there will be an associated template identity, as previously described. In general, depending on the global EEV (or default threshold value), and/or preliminary thresholding operations, more than one template identity may be included in an inter-template EEV region, such as one of the regions 501-504. Various methods for determining whether a template identity corresponds to an actual match, or "noise," are outlined below.

Figure 6A:
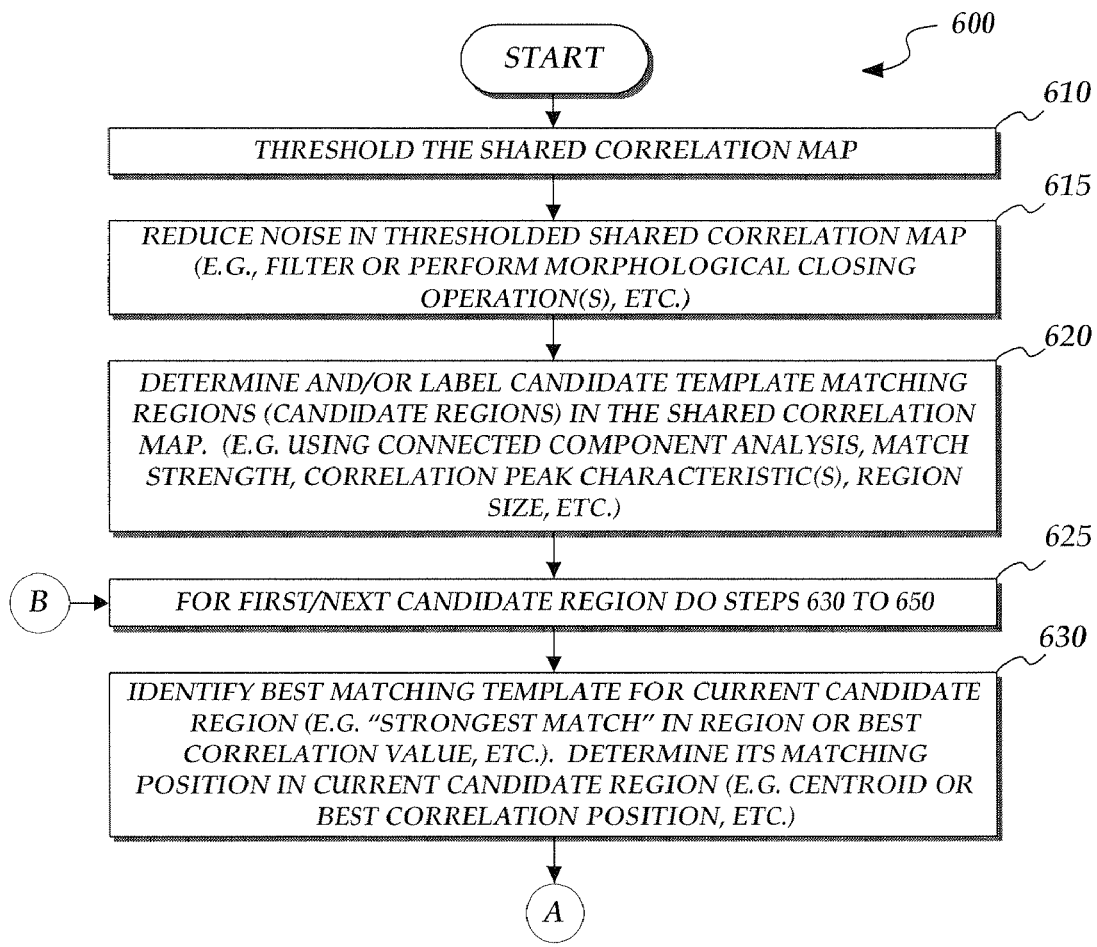
FIGS. 6A and 6B show a flow diagram illustrating one exemplary method of analyzing a shared correlation map and identifying multiple template matching positions in an image.
Figure 6B:
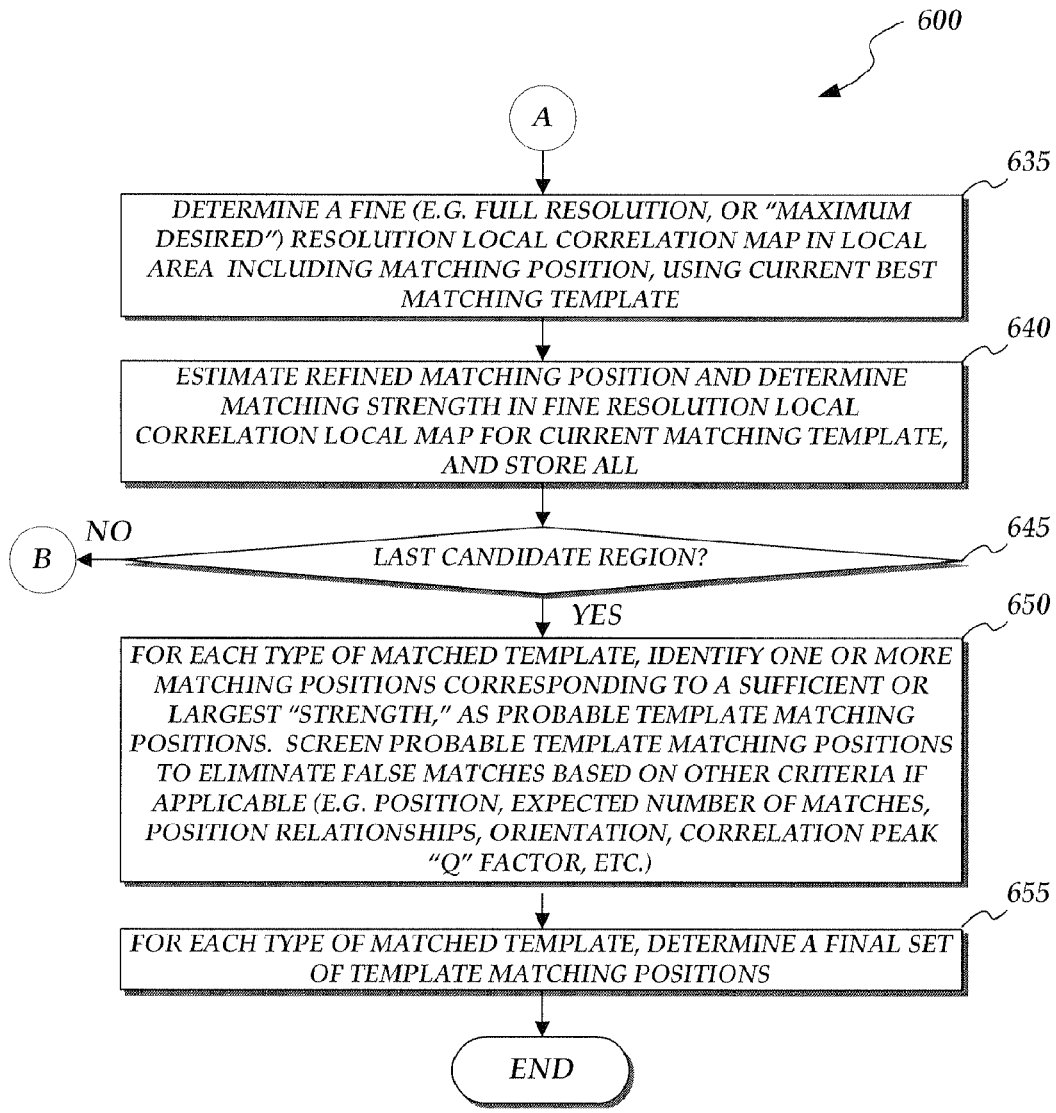

FIGS. 6A and 6B are a flow diagram of an exemplary routine 600 illustrating one exemplary embodiment of a method for analyzing a shared correlation map and identifying multiple template matching positions in an image. At a block 610, the shared correlation map may be thresholded. In various embodiments, a thresholding operation may be either global or local (adaptive), automatic, or using a pre-defined threshold based on selected template acceptance threshold. In one embodiment, the highest local inter-template EEV may be used as a basis for local thresholding (e.g., setting a local threshold at a percentage of the highest local inter-template EEV, or the like). At a block 615, the noise in the thresholded shared correlation map may be reduced (e.g., by filtering, and/or performing morphological closing operation(s), or the like). At a block 620, the candidate template matching regions in the shared correlation map are determined and/or labeled. It will be appreciated that in some embodiments "determining" and "labeling" operations may be synonymous and/or indistinguishable. In some embodiments, known connected component analysis methods may be used as one step for labeling candidate template matching regions. In some embodiments, matching strength (e.g., average correlation value) for a candidate template matching regions must be better than a predetermined threshold, or be better than the matching strength of one or more other candidate template matching regions, or the like. In other embodiments, a candidate template matching region may have to exhibit a characteristic wherein its "peak" is "localized" within a predetermined spatial limit or "shape." In another embodiment, a "correlation gradient" proximate to the best correlation value in the candidate template matching region must exceed a predetermined threshold, or be better than a correlation gradient of one or more other candidate template matching regions, or the like. In other embodiments, the size of a candidate template matching region (e.g., the number of connected pixels having a significant correlation value in a candidate template matching region) must be larger than a predetermined number, or larger than one or more other candidate template matching regions, or the like. In various embodiments, regions exemplified by the regions 501-504 in FIG. 5 may result from any or all of the previously outlined operations. That is, in some embodiments, the global EEV value provides sufficient thresholding and noise reduction, and the operations at blocks 610 and 615 may be optional or eliminated. In some embodiments, at block 620, the inter-template EEV regions may be identified or labeled as candidate template matching regions without further qualifying their peak characteristics or size, etc. However, in various other embodiments, inter-template EEV regions may be refined and/or labeled by any applicable now-known or later developed technique, in order to maximize the template matching reliability of a multiple template matching method according to this invention. Various techniques usable for region identification (labeling) and/or refinement, as well for finding the best template matching position within a region (e.g., a correlation value peak location) are known. For example, in addition to the various techniques suggested and outlined herein, applicable techniques may be found in U.S. Pat. Nos. 5,495,537, 4,589,140, and U.S. Patent Application Publication Nos. 2005/0058322A1 and 2005/0025277A1, all of which are hereby incorporated herein by reference in their entirety.

At a block 625, for the first or next candidate template matching region determined at block 620, the operations at blocks 630 to 650 are to be performed. At a block 630, the best matching template is identified for the current candidate template matching region (e.g., the template having the best normalized correlation value within the candidate template matching region, or the greatest number of corresponding pixels within the candidate template matching region, or the strongest correlation gradient within the candidate template matching region, or the like), and a best "coarse" matching position is determined for that best coarse matching template (e.g., a centroid or correlation peak position within the candidate template matching region, etc.). It will be appreciated, that if multiple template identities are "included within" or associated with a particular candidate template matching region, that the operations of block 625 may eliminate those that are best characterized as "noise" and define the best matching template within a particular candidate template matching region. The routine then continues to a point A as will be described in more detail below with respect to FIG. 6B.

As shown in FIG. 6B, from the point A the routine continues to a block 635. At block 635, a full resolution local correlation map in the local area including the best coarse matching position is determined, using the current best matching template. At a block 640, a refined matching position is estimated and a matching strength (e.g., normalized correlation value) is determined in a full resolution local correlation map for the current matching template, and all of the results are stored. At a decision block 645, if it is determined that the current candidate template matching region is not the last candidate template matching region, then the routine continues to a point B which returns to block 625 of FIG. 6A. If at decision block 645 it is determined that the current region is the last candidate template matching region, then the routine continues to a block 650.

At block 650, for each type of the best matched template, one or more best matching positions are identified corresponding to a sufficient or largest matching strength, as probable template matching positions. Probable template matching positions may be screened to eliminate false matches based on other criteria if applicable (e.g., known position limits, expected number of matches, position relationships, orientation, etc.). At a block 655, for each type of matched template, a final set of template matching positions is determined and the process ends.

Figure 7:
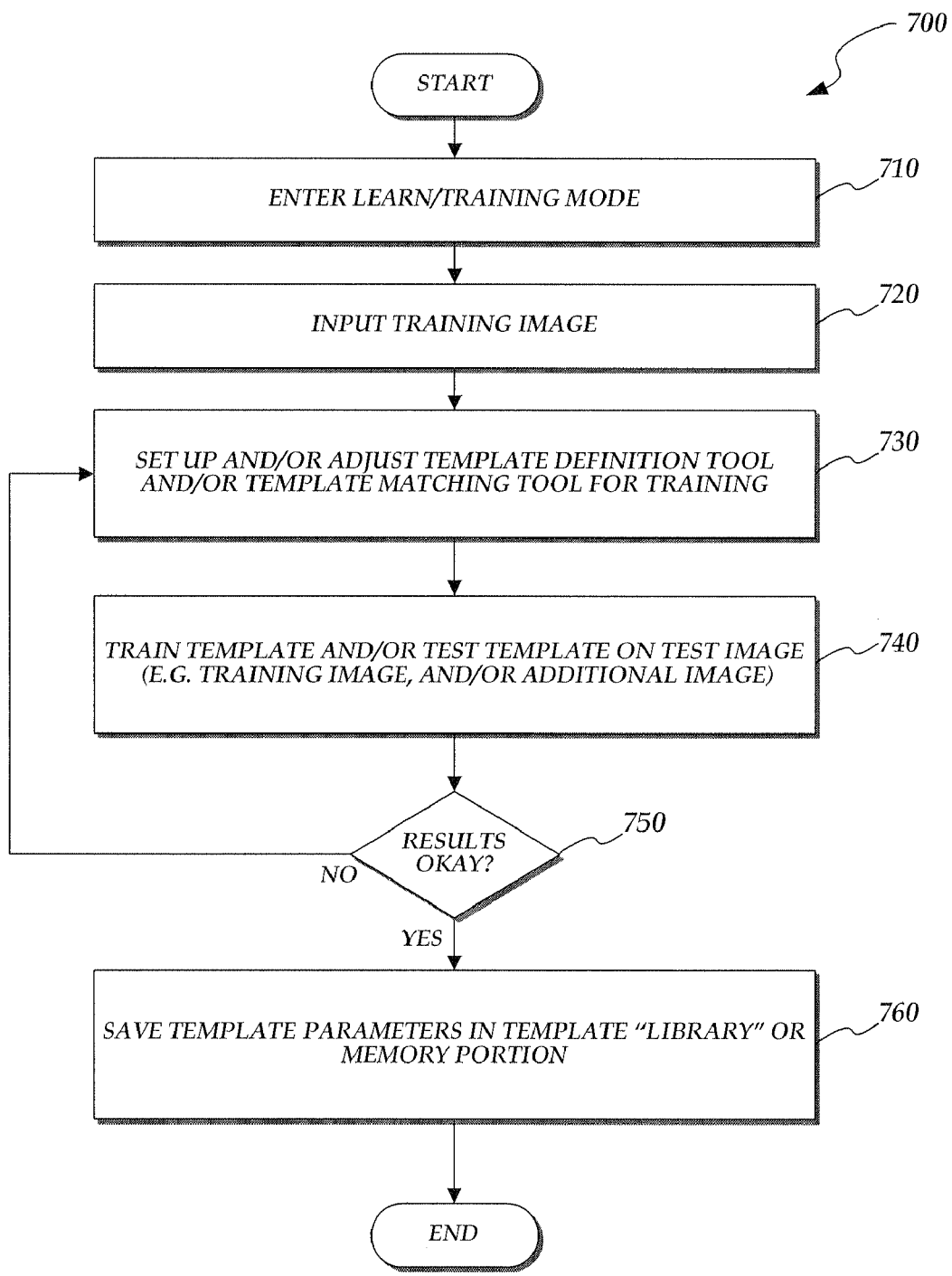
FIG. 7 is a flow diagram illustrating operations that may be performed during learn mode of a machine vision inspection system, to provide a template and parameters that may be included of a workpiece-specific or general purpose template library.

FIG. 7 is a flow diagram of an exemplary routine 700 illustrating operations that may be performed during learn mode of a machine vision inspection system, to provide a template and parameters that may be included of a workpiece-specific or general purpose template library, usable in accordance with one aspect of the invention. At a block 710, the user enters the Learn/Training mode. At a block 720, a training image is input. At a block 730, a template definition tool and/or a template matching tool for training is set up and/or adjusted. At a block 740, the template is trained and/or tested on a test image (e.g., a training image, and/or an additional image). At a decision block 750, if it is determined that the results are not okay, then the routine returns to block 730. If at decision block 750 it is determined that the results are okay, then the routine continues to a block 760 where the template parameters are saved in the template "library" or the memory portion, and then the routine ends. Various embodiments of such methods are implemented in various commercially available machine vision inspection systems, such as the previously referenced QUICK VISION® series of vision systems and QVPAK® software.

Figure 8:
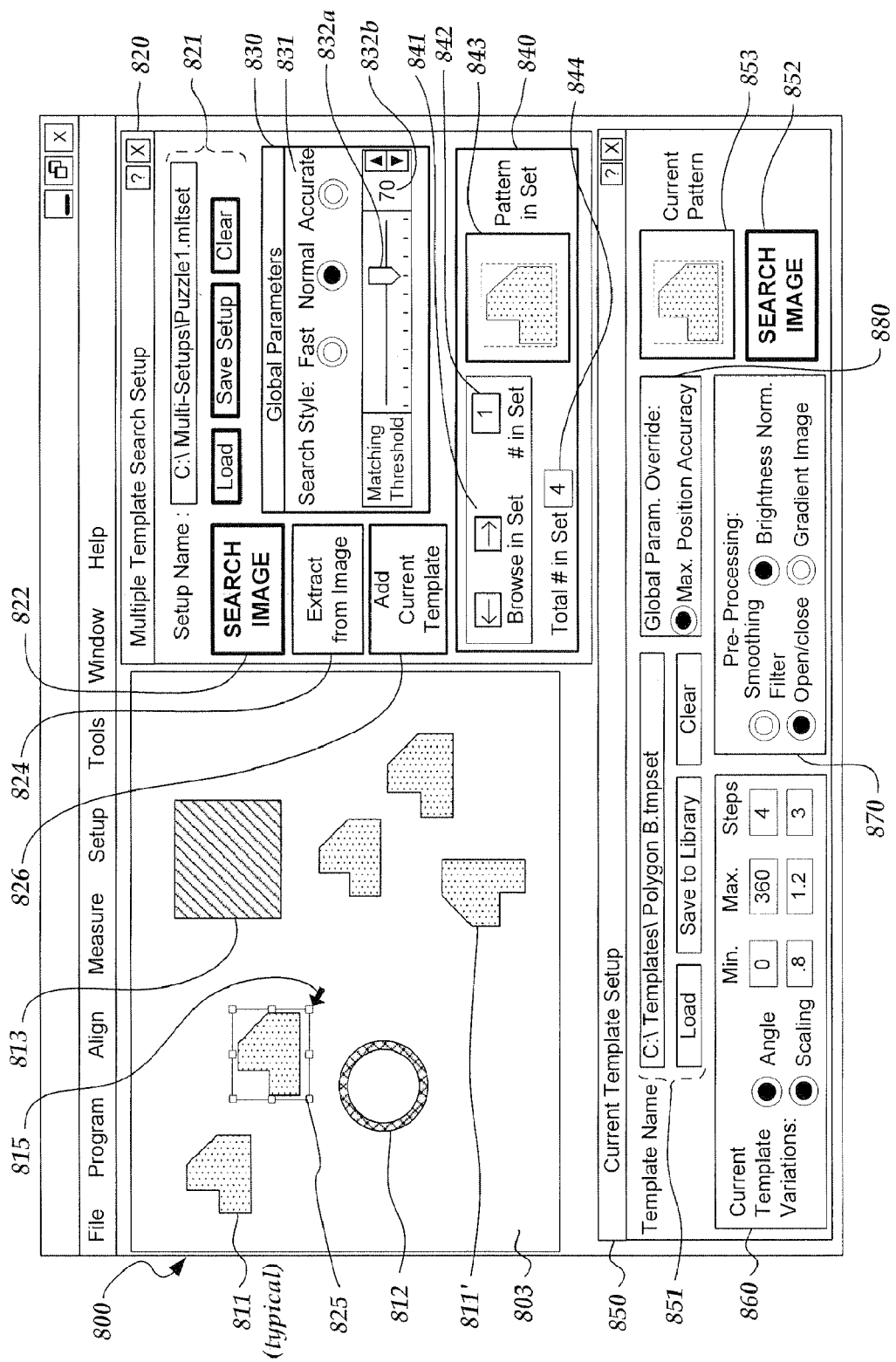
FIG. 8 is a screenshot illustrating one exemplary embodiment of a multiple-template search setup graphical user interface (GUI), suitable for permitting the user to determine or define a multiple-template search, and/or related individual template parameters.

FIG. 8 is a screenshot illustrating one exemplary embodiment of a multiple-template search setup graphical user interface (GUI) 800, suitable for permitting the user to determine or define a multiple-template search, and/or related individual template parameters. The GUI 800 includes an image display window 803, a cursor 815, a "Multiple Template Search Setup" window 820, and a "Current Template Setup" window 850.

The Multiple Template Search Setup window 820 may appear when a multiple template matching operation is requested during manual operation or learning mode operation, or when editing a part program, for example. The window 820 may include a multiple template setup file management portion 821 that includes a data entry box for entering and displaying a multiple template search setup file name, a button that may be clicked to load that file to be associated with the operations of the window 820, a button that may be clicked to save the setup information currently associated with the operations of the window 820 to that file, and a button to clear the setup information currently associated with the operations of the window 820.

The window 820 may also include a "Global Parameters" portion 830 for defining certain preferences for the multiple template search operations. In the embodiment shown in FIG. 8, the user may select certain preferences using "mutually exclusive" radio buttons. The user may select the "Fast" radio button to enhance the speed of the search. In that case, the template matching operations may comprise methods that provide the matching location for a particular template based on "coarse" matching locations (e.g., within a few pixels), or the like, without performing full resolution correlation operations to refine a matching location. For example, for a particular template or type of template, operations such as those outlined for block 630 of FIG. 6A may provide the final "matching location" and for that particular template, the "location refinement" operations at blocks 635 and 640 may be omitted. Such a "coarse" matching location may provide sufficient accuracy if the objective is to position a workpiece in a field of view with sufficient accuracy for performing subsequent edge-finding operations in a subsequent image of the workpiece, for example. If the user instead selects the "Accurate" radio, full resolution 2D template matching may be provided, for example, according to known practices in commercially available systems. This may be advantageous for many templates in many applications, since full correlation in a local area (e.g., the "location refinement" operations at blocks 635 and 640 in FIG. 6B) is generally not computationally expensive, and may be more reliable and more accurate. The "Normal" radio button may be selected to provide a balance between execution speed and position accuracy. In the embodiment shown in FIG. 8, the user may also define a desired matching threshold (e.g., to define the threshold for a "sufficient" matching strength in the operations of block 650 in FIG. 6B) by dragging the slider 832$a$ until the desired matching threshold value appears in the dynamically updated box 832*b*. In various embodiments, a matching threshold of 100 may correspond to the perfect match of a template with itself.

The window 820 may also include a browser portion 840 for reviewing the multiple templates associated with the current setup. The browser portion 840 may include forward and back buttons 841 for stepping through the various templates in a current set, a dynamically updated "template #" box 842 that displays the identifier or position of a the currently-browsed member of the set in a searching sequence, a thumbnail display box 843 of the currently-browsed member of the set, and a dynamically updated "total # in set" box 844 that displays the total number of templates in the current multiple template search setup. In some embodiments, the user may enter a new number in the "template #" box 842, in order to position the currently-browsed member of the set at a new position in the search sequence. In some embodiments, the user may click on the thumbnail display box 843, in order to activate the currently-browsed member of the set in the Current Template Setup window 850, and display its parameters therein (making it the "current template").

The image display window 803 shows four types of features that may be located by a multiple template search, if desired. Four instances a polygon feature 811, one rotated instance of the polygon feature 811', a circular feature 812 and a rectangular feature 813. One of the features 811 is surrounded by a template definition box 825, which may be created at any time in any portion of the image by using the cursor 815 in a known "rubberband" mode, when the window 820 is active. The contents of the template definition box 825 define a potential template that may be extracted from the image when the user clicks an "Extract from Image" button 824, included in the window 820. When the user clicks the Extract from Image button 824, the sub-image in the template definition box 825 is activated in the Current Template Setup window 850, e.g., it is displayed in a thumbnail display box 853, and its parameters and name are initially set to default values, which may subsequently be edited by the user. It becomes the "current template."

At any time that a "current template" is active in the Current Template Setup window 850, when the user clicks the Add Current Template button in the window 820, that template (including the template information and parameters currently associated with the operations of the window 850) is recorded as a member of the current multiple template search setup. In various embodiments, it is displayed in the thumbnail display box 843 and the boxes 842 and 844 are updated.

At any time, a current multiple template search setup may be tested or run by clicking the "SEARCH IMAGE" button 822. The resulting matches may be indicated on the display, and/or their identities and positions output according to known techniques. The user may then evaluate the efficacy of the current set or templates and their various parameters and update the set and/or parameters and retest, etc., until the search results are acceptable. The user may then save the tested multiple template search setup in a file, and for execution in a part program, if desired.

The Current Template Setup window 850 may, in various embodiments, supplement or replace other template definition tools included in a machine vision inspection system. The window 850 may include a template file management portion 851, that includes a data entry box for entering and displaying a template file name, a button that may be clicked to load that file from a library (such that the information is then associated with the operations of the window 850), a button that may be clicked to save the template information currently associated with the operations of the window 850 to that file name, and a button to clear the information currently associated with the operations of the window 820 (e.g., by clearing the current template, or resetting the current information of the window 850 to default values). An image of the current template may be displayed in a thumbnail display box 853.

The window 850 may also include a "Current Template Variations" portion 860 for providing rotated and scaled versions of the current template to be used in the multiple template search. In the embodiment shown in FIG. 8, either or both of these types of variations may be enabled by radio buttons which may be toggled on/off by a user. The user may enter minimum and maximum values for an angular variation range (e.g., an angular search range, in degrees), and the number of equally spaced "steps" for which rotated versions of the template are to be generated for searching an image. Similarly, the user may enter minimum and maximum values for a scaling variation range (e.g., in terms of a contraction/expansion coefficient that multiplies an original template size), and the number of steps to be provided. Generally, scaling may be applied to each angular variation of the template, as well as the original template. It will be appreciated that each of the template variations is, in effect, an additional member template of the multiple template search setup, and may be generated and stored as such, in various embodiments.

The window 850 may also include a "Pre-Processing" portion 870 for defining pre-processing operations that are to be applied to a template and image before searching the image using the template. Typical generic options may include a Smoothing Filter, morphological Opening/Closing sequences (e.g., to remove noise and smooth boundaries), and Brightness normalization, each of which may be added to the preprocessing operations by activating an associated radio button, for example. It will be appreciated that the various multiple template searching techniques described herein, included the shared correlation map techniques, may be applied to any type of similarly configured "pseudo-template" and "pseudo-image." That is, conventional images are not required. Therefore, the Pre-Processing portion may include an option to prepare a template and image to be matched as transformed "gradient pseudo-images," or the like.

The window 850 may also include a "Global Parameter Override" portion 880, wherein the user may turn on a radio button to override the previously-described search style 831 for the current template, to determine the matching position(s) for the current template with the maximum accuracy, for example. A global parameter than is overridden for the current template may still apply to the other templates in the set. At any time, the current template parameters may be tested or run by clicking a "SEARCH IMAGE" button 852 in the window 850. The resulting matches (for the current template only) may be indicated on the display, and/or their identities and positions output according to known techniques. The user may then evaluate the efficacy of the current template parameters and update the parameters and retest, etc., until the search results are acceptable. The user may then save the tested template parameters to a template library file, and/or add the tested current template to the current multiple template setup by clicking the "Add Current Template" button 826 in window 820 (which may operate to automatically save the template to the template library, in various embodiments).

Although the various systems and methods outlined above have been described as providing and operating on various images, "pseudo-images," and "maps," for purposes of explanation, it will be appreciated that such images, "pseudo-images," or "maps" essentially comprise data that may be organized, stored, and/or represented mathematically in a variety of alternative configurations. Thus, it should be appreciated that the expression "shared correlation map" essentially refers to any of a variety of data configurations usable according to the basic teachings disclosed herein, whether or not such configurations are readily recognized as conventional images, "pseudo-images," or "maps."

While preferred and exemplary embodiments of the invention have been illustrated and described, it will be appreciated that various changes can be made therein according to the principles of this invention without departing from the spirit and scope of the invention.

The embodiments of the invention in which an exclusive property or privilege is claimed are defined as follows:

1. A method of operating a precision machine vision inspection system to search for matches for multiple templates in an image, the method comprising:
   setting up a plurality of templates to be used for searching the image; and
   searching the image using multiple templates, wherein searching the image using multiple templates comprises:
      determining at least one early elimination condition, the at least one early elimination condition comprising an inter-template early elimination condition, wherein the inter-template early elimination condition is based at least partially on an inter-template early elimination value that characterizes the degree of matching between one of the plurality of templates and the image, at a location in the image;
      determining a first inter-template early elimination value for at least a first location in the image, the first inter-template early elimination value characterizing the degree of matching between a first template of the plurality of templates and the image at the first location; and
      rejecting at least a second template of the plurality of templates as a potential match at the first location based on comparing the first inter-template early elimination value to a second value characterizing the degree of matching between the second template of the plurality of templates and the image at the first location;
      wherein the first inter-template early elimination value is determined according to a first set of operations, and the second value is determined according to a second set of operations that is different than the first set of operations, and
      wherein the first inter-template early elimination value consists of a correlation function value determined based on a complete set of correlation function value determining operations comprising pixel-by-pixel comparison operations between the first template and the image, at a first level of resolution; and the second value consists of an incomplete correlation function value determined based on an incomplete set of correlation function value determining operations comprising pixel-by-pixel comparison operations between the second template and the image at the first level of resolution.

2. The method of claim 1, wherein the method comprises ending the incomplete set of correlation function value determining operations when an incomplete correlation function value corresponding to the second template at the first position indicates a worse template match than the first inter-template early elimination value.

3. The method of claim 1, wherein the first value is a value that is normalized based on a number of pixels in the first template and the second value is a value that is normalized based on a number of pixels in the second template.

4. The method of claim 1, wherein the method further comprises:
   determining a shared correlation map comprising at least one respective inter-template early elimination value stored in a manner such that it is associated with its corresponding respective location in the image; and
   for each at least one respective inter-template early elimination value of the shared correlation map, storing an indication of its corresponding respective template in a corresponding manner.

5. The method of claim 4, wherein each respective inter-template early elimination value of the shared correlation map is normalized such that each of their values reflect the degree to which their respective templates match the image at their respective locations in the image, relative to the other respective inter-template early elimination values.

6. The method of claim 5, wherein each at least one respective inter-template early elimination value of the shared correlation map is a normalized correlation function value determined based on a complete set of correlation function value determining operations comprising pixel-by-pixel comparison operations at a first level of resolution between its corresponding respective template and the image at the corresponding respective location, and wherein determining the shared correlation map comprises:
   replacing a respective normalized inter-template early elimination value of the shared correlation map and its corresponding respective template that are associated with a particular location in the image when a subsequent normalized correlation function value determined based on the complete set of correlation function value determining operations comprising pixel-by-pixel comparison operations between a different respective template and the image at a first level of resolution, at the particular location, indicates that the different respective template provides a better match to the image at that particular location, wherein
   replacing the respective normalized inter-template early elimination value of the shared correlation map and its corresponding respective template comprises using the subsequent normalized correlation function value as a new inter-template early elimination value stored in a manner such that it is associated with the particular location in the image, and storing an indication of the its corresponding different respective template in a corresponding manner.

7. The method of claim 6, wherein the method comprises determining a set of respective template matching positions and their corresponding respective matching templates, based on analyzing the shared correlation map.

8. The method of claim 7, wherein analyzing the shared correlation map comprises:
   treating the shared correlation map as a pseudo-image;
   determining at least a first template matching region in the pseudo-image; and
   determining a first respective template matching position for a first respective matching template within the first template matching region.

9. The method of claim 8, wherein each at least one respective inter-template early elimination value of the shared correlation map is a correlation function value determined based on a complete set of correlation function value determining operations comprising pixel-by-pixel comparison operations at a first level of resolution between its corresponding respective template and the image at the corresponding respective location, the first respective template matching position is a preliminary template matching position; and the method further comprises:

estimating a refined matching position for the first respective matching template, based on a fine resolution correlation map, the fine resolution correlation map determined based on correlating the first respective matching template to the image at a higher level of resolution than the first level of resolution, in a local area including the preliminary first respective template matching position.

10. The method of claim 1, wherein the plurality of templates comprises a set of different templates corresponding to a set of different workpiece features.

11. The method of claim 1, wherein the plurality of templates comprise a set of similar templates corresponding to a single workpiece feature, the members of the set of similar templates varying from one another with respect to at least one of a) their angular orientation relative to the image and b) their scaling relative to the image.

12. The method of claim 1, wherein setting up a plurality of templates to be used for searching the image comprises determining the order in which each of the plurality of templates will be used for searching the image.

13. A precision machine vision inspection system that is operable to efficiently search for matches for multiple templates in an image, the precision machine vision inspection system comprising:

a multiple template setup portion that is operable by a user to set up a plurality of templates to be used for searching the image; and a multiple template matching portion that is operable to search the image using multiple templates, wherein searching the image using multiple templates comprises:

determining at least one early elimination condition, the at least one early elimination condition comprising an inter-template early elimination condition, wherein the inter-template early elimination condition is based at least partially on an inter-template early elimination value that characterizes the degree of matching between one of the plurality of templates and the image, at a location in the image;

determining a first inter-template early elimination value for at least a first location in the image, the first inter-template early elimination value characterizing the degree of matching between a first template of the plurality of templates and the image at the first location; and rejecting at least a second template of the plurality of templates as a potential match at the first location based on comparing the first inter-template early elimination value to a second value characterizing the degree of matching between the second template of the plurality of templates and the image at the first location;

wherein the multiple template setup portion includes a graphical user interface (GUI) comprising a portion for establishing a global search parameter that is applied universally when searching the image using the multiple templates, and wherein the multiple template matching portion comprises a shared correlation map portion that provides and evaluates a shared correlation map during operations performed to search the image using the multiple templates; and the global search parameter is applied when evaluating the shared correlation map.

14. The precision machine vision inspection system of claim 13, wherein the multiple template setup portion is operable to determine the order in which each of the plurality of templates will be used for searching the image.

15. The precision machine vision inspection system of claim 13, wherein the multiple template setup portion includes a graphical user interface (GUI) comprising a portion for browsing from a one template to another template of the plurality of templates.

16. The precision machine vision inspection system of claim 15, wherein the GUI includes a button that operates such that the user can browse from a one template to another template of the plurality of templates by a single click of the button.

* * * * *

UNITED STATES PATENT AND TRADEMARK OFFICE
CERTIFICATE OF CORRECTION

PATENT NO. : 7,636,478 B2                                    Page 1 of 1
APPLICATION NO. : 11/461418
DATED : December 22, 2009
INVENTOR(S) : Robert Kamil Bryll It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 609 days.

should read (*) Notice: Subject to any disclaimer, the term of this patent is extended or adjusted under 35 U.S.C. 154(b) by 697 days.

| COLUMN | LINE | ERROR |
|---|---|---|
| 18 (Claim 6, | 50 line 28) | "of the its" should read --of its-- |
| 20 (Claim 15, | 35 line 4) | "from a one template" should read --from one template-- |
| 20 (Claim 16, | 39 line 3) | "from a one template" should read --from one template-- |

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,478 B2 | Page 1 of 1 |
| APPLICATION NO. | : 11/461418 | |
| DATED | : December 22, 2009 | |
| INVENTOR(S) | : Robert Kamil Bryll | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 609 days.

should read (*) Notice: Subject to any disclaimer, the term of this patent is extended or adjusted under 35 U.S.C. 154(b) by 747 days.

| COLUMN | LINE | ERROR |
|---|---|---|
| 18 (Claim 6, | 50 line 28) | "of the its" should read --of its-- |
| 20 (Claim 15, | 35 line 4) | "from a one template" should read --from one template-- |
| 20 (Claim 16, | 39 line 3) | "from a one template" should read --from one template-- |

This certificate supersedes the Certificate of Correction issued May 18, 2010.

Signed and Sealed this

Thirty-first Day of August, 2010

David J. Kappos
*Director of the United States Patent and Trademark Office*